(12) United States Patent
Park et al.

(10) Patent No.: US 6,255,381 B1
(45) Date of Patent: Jul. 3, 2001

(54) PROCESS FOR MANUFACTURING AN ACRYLIC ANTISLIPPING AGENT COMPOSED OF SMALL AMOUNTS OF SOLID CONTENT

(75) Inventors: In-Hwan Park; Ja-Soon Jang, both of Daejeon; Sang-Won Seol, Seoul; Jung-Mok Suh, Daejeon, all of (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/498,996

(22) Filed: Feb. 7, 2000

Related U.S. Application Data

(63) Continuation-in-part of application No. 09/077,195, filed on Nov. 18, 1998, now abandoned, and a continuation-in-part of application No. PCT/KR96/00217, filed on Nov. 27, 1996.

(30) Foreign Application Priority Data

Nov. 27, 1995 (KR) ................................................ 95 43894

(51) Int. Cl.⁷ .............................. C08L 33/06; C08K 5/09; C08J 3/05
(52) U.S. Cl. ......................... 524/522; 524/284; 524/523; 528/486
(58) Field of Search ................................... 524/522, 523, 524/284; 528/486

(56) References Cited

FOREIGN PATENT DOCUMENTS

| 1 156 803 | 11/1983 | (CA) . |
|---|---|---|
| 868 130 | 1/1953 | (DE) . |
| 0 350 834 | 1/1990 | (EP) . |
| 54-74292 | 6/1979 | (JP) . |
| 57-56598 | 4/1983 | (JP) . |
| 59-4460 | 1/1984 | (JP) . |
| 62-70461 | 3/1987 | (JP) . |
| 62-110997 | 5/1987 | (JP) . |
| 1-183596 | 7/1989 | (JP) . |
| 2-34671 | 2/1990 | (JP) . |
| 2-245086 | 9/1990 | (JP) . |
| 4-198373 | 7/1992 | (JP) . |
| 4-303653 | 10/1992 | (JP) . |
| 4-306273 | 10/1992 | (JP) . |

OTHER PUBLICATIONS

Patent Abstracts of Japan—No. 06–80953, Japanese Patent Office, Mar. 22, 1994 (Abstract Only).

*Primary Examiner*—Tae H. Yoon
(74) *Attorney, Agent, or Firm*—Finnegan, Henderson, Farabow, Garrett & Dunner, LLP

(57) ABSTRACT

This invention relates to a process for manufacturing a highly efficient antislipping agent based on acrylic latexes containing small amount of solid content, wherein said acrylic latexes are composed of two different acrylic latexes containing small amount of solid content; one being flexible with a low glass transition temperature (referred to as 'Tg' hereafter) when dried and the other being hard with a relatively high Tg when dried, followed by blending through neutralization using aqueous ammonia. Thus, the latexes are well blended and their physical properties like homogeneity, tacky property, flexibility and hardness can be easily controlled.

7 Claims, No Drawings

PROCESS FOR MANUFACTURING AN ACRYLIC ANTISLIPPING AGENT COMPOSED OF SMALL AMOUNTS OF SOLID CONTENT

This is a continuation-in-part of application Ser. No. 09/077,195, filed Nov. 18, 1998 now abandoned and a CIP International Application No. PCT/KR96/00217, filed Nov. 27, 1996.

BACKGROUND OF THE INVENTION

1. Field of the Invention

This invention relates to a process for manufacturing a highly efficient antislipping agent composed of acrylic copolymers based on small amounts of solid content; wherein two kinds of acrylic latexes composed of small amounts of solid content are prepared by using pertinent acrylic monomers in low or high glass transition point side, being well blended and homogenized by neutralizing with ammonia water.

2. Description of the Related Art

According to the composition of antislipping agents in the first stage, some hot-melt adhesives were coated along several lines on the surfaces of packaging boxes made of craft paper, the adhesives proved to have antislippling effects owing to its initial strong adhesive strength when stacking packaging boxes and some disadvantages were recognized in that a) separation between packaging boxes were difficult, and b) after separation, the packaging surfaces are torn or stained, thus inflicting some damages to the surfaces due to extremely strong adhesive strength [Japanese Patent Unexamined Publication No. 1-183596(1989)].

To be free from weak points, some antislipping agents as a hyblid of inorganic and organic substances were developed:

a) Inorganic substance included silicahydrosol containing 20 to 30 wt % of colloidal silica whose particle size was in the range of 10 to 20 $\mu$m. Silicahydrosol in liquid phase was useful not to be whitened in handling when coated or dried. Now that said the size was too small, however, its homogeneous dispersion was so difficult that desirable antislipping effects could not be gained [Canadian Patent No. 1,156,803(1980), Japanese Patent Unexamined Publication Nos. 2-245086 (1990) and 4-303653 (1992)].

b) Organic substance composed of stylene and acrylic acid as well as some composition with reactive groups proved to have less antislipping effects [Japanese Patent Unexamined Publication No. 57-565989 (1982)].

Further, some antislipping agents containing inorganic and organic substances concurrently included a composition in which synthetic resin binder, using silica powder and poly(acrylamide) treated with nonionic cellulose derivatives as a protective colloid, was dispersed in water. After the agents were coated or dried, they showed good antislipping effects but when used repeatedly, its antislipping effects become deteriorated and in particular, a poor dispersion of antislipping agent itself affected its storage stability badly [Japanese Patent Unexamined Publication No. 59-4460 (1984)].

In view of facts above-mentioned, there were some methods in which a part of resin with adhesive strength was blended to ethylene-vinyl acetate copolymer emulsion, followed by additional blending of silica, fillers and releasing agents. However, the methods proved to have insufficient antislipping effects and when packaging boxes were separated, their surfaces were torn off or contaminated owing to its extremely strong adhesive strength or the lack of reutilization [Japanese Patent Unexamined Publication No. 54-65385(1988), 62-70461(1987), 62-110997(1987) and 4-198373(1992)].

Recently, some latex-typed antislipping agents using nonionic surfactants as a emulsifier were developed. Each particle in the latex consists of both a core as a hard segment and a shell as a soft segment and when drying, it showed good antislipping properties. But since there was no distinction between hard and soft segments with increasing of solid content in the latex, it was still difficult to prepare a latex with storage stability [Japanese Patent Unexamined Publication No. 4-306273(1992)].

SUMMARY OF THE INVENTION

The object of this invention is to provide a process for manufacturing an antislipping agent with high viscosity, latex-typed compounds with storage stability, being characterized by the facts that an antislipping agent with small amounts of solid content mentioned in the above has a good harmony between hard and soft segments as well as its storage stability.

This invention is to provide a process for manufacturing an antislipping agent characterized by comprising steps of;

1) through the emulsion polymerization between acrylic monomers of 20 to 80 wt % with glass transition point(Tg) in the range of −85 to −5° C. and acrylic monomers of 20 to 80 wt % with Tg in the range of 8 to 153° C., an acrylic latex with relatively low scope of Tg is prepared;

2) through another emulsion polymerization in another container between acrylic monomers of 10 to 60 wt % with Tg in the range of 8 to 153° C. and acrylic monomers of 40 to 90 wt % with Tg in the range of −85 to −5° C. an acrylic latex with relatively high scope of Tg is prepared; and 3) the acrylic latex mentioned in the step 2) of 5 to 60 wt parts is chemically blended with that in the step 1) of 100 wt parts, and the blending is completed by neutralizing with ammonia water.

DETAILED DESCRIPTION OF THE INVENTION

This invention relates to a process for manufacturing an antislipping agent composed of small amounts of solid content, wherein an acrylic latex having low Tg is blended in a certain ratio with an acrylic latex having high Tg and after neutralization, and if necessary, an inorganic compound and its blending/dipersing agents may be added to the blend.

More detailed process for manufacturing an acrylic antislipping agents of this invention is as follows:

In an effort to prepare an acrylic latex with flexibility according to this invention, acrylic monomers(viscosity: 10 to 30 cps) having low Tg in the range of −85 to −5° C. are selected and these monomers provide adhesive strength to an antislipping agent of this invention.

More specfically, the monomers include ethylacrylate, n-butylacrylate, isopropylacrylate, 2-ethylhexylacrylate, n-hexylmetacrylate, laurylmetacrylate, 2-hydroxyethyllacrylate and hydroxypropylacrylate, and one or more acrylic monomers may be used. In case of preparing an acrylic latex having low Tg in the range of −85 to −5° C., the content of monomers should be preferably in the range of 20 to 80 wt %. Should the content be less than 20 wt %, an antislipping agent itself, prepared through emulsion polymerization, lacks the antislipping effects due to the hardness and insufficient tacky property but if the content exceed 80 wt %, its insufficient, cohesive force due to the excessive flexibility may lead to decreasing the antislipping effects, while having high tacky property when dried.

Further, in order to prepare an acrylic latex with good storage stability, an aqueous cellulose is used to enhance the viscosity of an dispersed solution. More specifically, the celluloses mentioned here include methycellulose, ethylcellulose, hydroxyethylcellulose and hydroxypropylmethylcellulose. Hence, one or more celluloses may be used with 0.05 to 20 wt parts in proportion to 100 wt parts of water, a polymerization solvent.

In general, when small amounts of monomers are under emulsion polymerization, far less content of celluloses designed for the dispersion may be responsible for a latex without dispersion stability.

However, in the event that celluloses are employed to reaction solvents in the range of scope above-mentioned, the viscosity in reaction solution increased and acrylic monomers dropped as a liquid phase are favorably dispersed, showing the polymerization with dispersion stability. An acrylic latex, so formed, is favorable in terms of its storage stability and despite less solid content of the latex, the antislipping effects prove to be desireable. Hence, if the content of celluloses for dispersion is less than 0.05 wt parts, there are little dispersion effects associated with the viscosity of reaction solvent and the emulsion polymerization is not well progressed. Nevertheless, if the content of celluloses for dispersion exceeds 20 wt parts, the disperse force is on the contrary decreased due to high viscosity of the reaction solution in emulsion polymerization.

In order to provide the hardness to an antislipping agent of this invention, another acrylic latex having relatively high Tg in the range of 8 to 153° C. is prepared by emulsion polymerization and then blended with the acrylic latex, so obtained in the above.

More specifically, the monomers include methylacrylate, methylmetacrylate, ethylmetacrylate, isobutylmetacrylate, 2-hydroxymethylmetacrylate, hydroxypropylmetacrylate, acrylamide, diacetoneacrylamide, glycidylmetacrylate, styrene, vinylacetate and acrylonitrile, etc. Among them one or more monomers can be employed. In line with the preparation of an acrylic latex having high Tg, acrylic monomers of 10 to 60 wt % having Tg in the range of 8 to 153° C. should be preferably contained. If the content is less than 10 wt %, the cohesive force of an antislipping agent itself become weak and in case of exceeding 60 wt %, the antislipping effects don't exist due to the lack of tacky property.

The emulsion polymerization of this invention is stirred at 100 to 300 rpm under nitrogen atmosphere at 50 to 80° C. and radical initiators for the polymerization are employed. More specifically, the initiators include ammonium persulfate, potassium persulfate, 4, 4'-azobis4-cyanopentanoic acid, azobisisobutiamidine, potassium peroxide, hydrogen peroxide and cunmenhydroperoxide. The appropriate amount of initiators is 0.02 to 5 wt parts in proportion to a total monomer of 100 wt parts. If the amount of initiators is less than scope in the above, the polymerization speed is quite fast or slow and in case of outside of the scope, an latex with dispersion stability is not obtained.

Further, crosslinking agents include divinylbenzene, butylmelamine, di- or triurethane acrylate, trimetylolpropane trimetacrylate and N, N'methylenebisacrylamide. The amount of the crosslinking agents is in the range of $0.2 \times 10^{-3}$ to $5 \times 10^{-3}$ wt parts in proportion to a total monomer of 100 wt parts. If the amount of crosslinking agents is less or more than scope in the above, the tacky property of an sntislipping agent comes to decrease.

Also, in order to the additional adhesive strength to an antislipping agent, some monomers, having various kinds of carboxylic acids, are employed in the emulsion polymerization as above-mentioned. One or more monomers selected from acrylic acid, metacrylic acid, maleic acid and itaconic acid are used. The amount of the monomers used in emulsion polymerization is in the range of 0.05 to 7 wt parts in proportion to a total monomer of 100 wt parts. Hence, if the content of these monomers is less than 0.05 wt parts, the antislipping effects are not noticeable due to the lack of adhesive strength and in case of exceeding 7 wt parts, the emulsion polymerization becomes unstable under acidic media caused by lumping of latexes.

According to this invention, anionic and nonionic surfactants may be used individually or concurrently for the emulsion polymerization, where the stability of a latex is greatly affected by the kinds and amounts of surfactants.

The anionic surfactant includes sodium alkylbenzene sulfonate, sodium alkylsulfate, sodium alkylsulfonate, sodium dialkylsulfosuccinate, fatty acid soap, sodium alkylethoxysulfate, alkylphenolethoxylate and fatty acid ethoxylate.

The nonionic surfactants include one having HLB (Hydrophilic Lipophilic Balance) value of 8 to 18; for example, polyethyleneglycol nonylphenylether, polyethyleneglycol octylphenylether, polyethyleneglycol dodecylphenylether, polyethyleneglycol alkylarylether, polyethyleneglycol oleyl ether, polyethyleneglycol laurylether, polyethyleneglycol alkylphenyl ether, polyethyleneglycol olefinic acid ether, polyethyleneglycol distearic acid ether, polyethyleneglycol sorbitan monolaurate, polyethyleneglycol sorbitan monostearate, polyethyleneglycol alkylether, polyoxiethylenelauryl alcohol ether, and polyoxiethylenelauryl fatty acid ester. They are used one or a mixture of two. The appropriate amount of the surfactants is in the range of $0.2 \times 10^{-4}$ to $1 \times 10^{-2}$ wt parts in proportion to 100 wt parts of water, a reaction solvent. Hence, if the amount is less than $0.2 \times 10^{-4}$ wt parts, the latex is liable to be broken easily and in case of exceeding $1 \times 10^{-2}$ wt parts, the interfacial tention of an antislipping agent is on the contrary decreased.

In order to modulate the molicular weight of a latex in this invention, chain transition agents are used. More specifically, the agents include carbon tetrachloride, carbon tetrabromide, dodecylmercaptan and n-butylmercaptan. The amount is 0.005 to 5 wt parts in proportion to a total monomer of 100 wt parts. If this amount is less than scope in the above, their effects are not noticeable and in case of exceeding scope in the above, the polymerization speed is quite slow and a resin with flexibility cannot be produced due to its smaller molecular weights.

In order to blend an acrylic latex having low Tg and another acrylic latex having high Tg in the range of pH 2 to 5, ammonia water in 10% concentration is used. The appropriate scope of pH during neutralization is 6 to 8 and at any pH excluding the scope, the storage stability of the blended latex is significantly decreased. Hence, as for the blending ratio, an acrylic latex having high Tg of 5 to 60 wt parts is blended in proportion to an acrylic latex having low Tg of 100 wt parts, and then if the blending ratio is less than 5 wt parts, the viscosity of the latex is low and in case of exceeding 60 wt parts, the antislipping effects are decreased due to higher hardness.

Further, in order to allow more antislipping effects to an latex prepared in said blending in this invention, inorganic compounds (e.g., silica powder, silica gel, glass powder, talc, clay, calcium carbonate, magnesium carbonate, zinc oxide, barium sulfate, etc.) are added, however, in case of using silica and/or glass powder, the surface is previously coated by silane coupling agents (e.g., γ-aminopropyltriethoxysilane, γ-glydoxypropyltrimethoxysilane, etc.) and followed by thermal reaction at 80 to 100° C. for 0.5 to 2 hours prior to use the powders. The amount of inorganic compounds is 0.03 to 12 wt parts in proportion to 100 wt parts of an latex prepared by blending as the condition in the above. If the content of inorganic compounds is less than 0.03 wt parts, any antislipping effects are not noticeable, and in case of exceeding 12 wt parts, the adhesive strength becomes poor due to a larger cohesive force.

During the storage of these antislipping agents, their stability can be gained by chemically binding between two kinds of acrylic latexes with carboxylic acid groups and ammonia water. Further, when antislipping agents in the above are coated and dried, the cross-linking reaction with imide bond partially occurs between carboxylic acid groups in the latex and ammonia as the following reaction scheme [German Patent No. 868,130 in 1858]. Cross-linking reactions like this among latexes may bring forth some benefits such as the good homogenization as well as the increase of the mechanical strength.

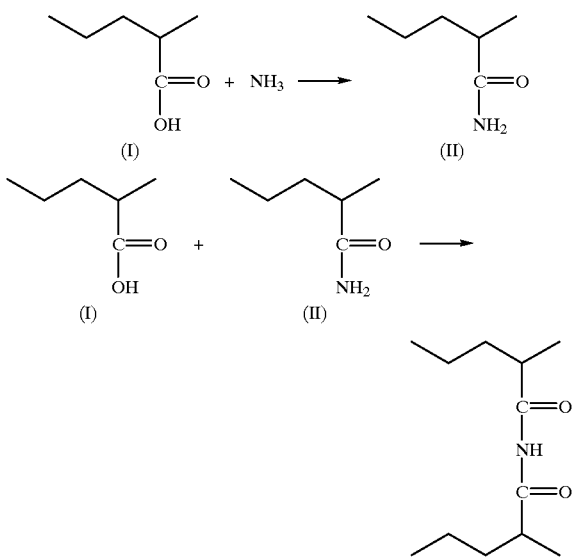

In the meanwhile, in order to blend some latexes obtained in the above and an inorganic compound like silica together one or more of various types of dispersing agents in this invention (e.g., casein, gelatin, polymer organic acid ammonium salt, acrylic polymer aqueous solution, sodium polyacrylate, denatured sodium polyacrylate, etc.) are used. The amount of the inorganic compounds is 0.05 to 5 wt parts in proportion to 100 wt parts of the antislipping agent. If the amount is less than 0.05 wt parts, the dispersing agent is less effective, and in case of exceeding 5 wt parts, the cohesive force of an antislipping agent itself is decreased.

In line with an antislipping agent, so prepared by a process of the invention mentioned in the above, the solid content is adjusted in the range of 2 to 8 wt %, being relatively less than that of 30 to 50 wt % of ordinary antislipping agents, and the viscosity of an antislipping agent in this invention is in the scope of 100 to 2,000 cps. Therefore, the effects of this invention are that a) since an antislipping agent has an appropriate viscosity, in case of coating on a packaging box made of craft paper by spray method, the working procedure is convenient, and b) since latexes on a packaging box are well dispersed in order to have appropriate hardness and flexibility, coated and dried, the antislipping effect may be noticeable.

This invention will be explained in more detail by the following examples, but the claims are not limited to, these examples.

EXAMPLES 1 to 18

Based upon the composition as illustrated in the following Table 1, 0.8 g of polyethyleneglycol nonylphenylether (10 wt %), 1.17 g of sodium alkylbenzene sulfonate (10 wt %), 0.17 g of ammonium persulphate, $1.64 \times 10^{-3}$ g of divinylbenzene and 0.10 g of acrylic acid were charged to 100 g of hydroxyethylcellulose solution (0.5 wt parts) in a round flask (250 cc) equipped with a dropping funnel and stirred for about 30 minutes. Meantime, a mixture of 1.17 g of methylmetacrylate, 1.17 g of butylacrylate, 1.67 g of ethylacrylate and 0.08 g of carbon tetrabromide was charged to another flask (50 cc). This mixture was dropwisely added to the above flask, and stirred and emulsified. While the emulsified solution were dropped at the speed of 1 to 2 drops per second through a dropping funnel in a reactor (reaction temperature: 70° C., stirring rate: 120 rpm) equipped with a reflux condenser under inert atmosphere, the reaction was performed for 4 to 5 hours.

The reactant was cooled to room temperature and neutralized at pH 7 thougth the addition of 10 wt % of ammonia water (12.21 g). Thereafter, as 2.20 g of another latex adjusted Tg at 37.2° C. was added to neutralized latex together with 0.50 g of silicasol coupled with 0.05g of γ-aminopropyltriethoxysilane, and then was blended at 120 rpm for 20 to 30 minutes to obtain the good dispersion.

COMPARATIVE EXAMPLES 1 TO 17

Based upon the composition as illustrated in the following Table 1, 0.8 g of polyethyleneglycol nonylphenylether (10 wt %), 1.17 g of sodium alkylbenzene sulfonate (10 wt %), 0.17 g of ammonium persulphate and 0.05 g of acrylic acid were charged to 100 g of distilled water in a round flask of the same type as mentioned in the above Examples 1 to 18. Meantime, a mixture of 1.17 g of methylmetacrylate, 1.17 g of butylacrylate, 1.67 g of ethylacrylate and 0.08 g of carbon tetrabromide was charged to another flask (50 cc). This mixture was dropwisely added in the above flask, and stirred to be emulsified. While the emulsified solution, through a dropping tunnel, were dropped at the speed of 1 to 2 drops per second in a reactor (reaction temperature: 70° C., stirring rate: 120 rpm) equipped with a reflux condenser under inert atmosphere, the reaction was performed for 4 to 5 hours. As the result, an inhomogeneous products from emulsion polymerization were gained. This was attributed to the fact that since the content of thickners, playing as a dispersing stabilizer in the reaction solution for dispersion, were small and thus, a part of disordinary products with inhomogenity is gained.

On the other hand, in case of comparative examples 2 and 3,0.65 to 0.80 wt parts of hydroxyethylcellulose were added into distilled water to obtain homogeneous products in emulsion polymerization. However, due to less use of thickners, the adhesive force and the reusability were proved to be poor. Meantime, to stabilize the latex solutions, they were neutralized based upon the same manner as mentioned in the above Examples 1 to 18. As shown in Comparative examples 13 and 14 on Table 1, in the event that the reaction was not stabilized by adding relatively larger amounts of acrylic acid in monomer composition, latexes were broken and produced a part of lumps together and thus, physical properties were remarkably decreased. Further, as mentioned in comparative example 1, in the event that the reaction were performed by adding relatively larger amounts of methylmetacrylate in monomer composition, the products when dried, so formed, were extremely hard and thus, the antislipping effects were proved to be poor. As illustrated in comparative example 8, in the event that the reaction was performed by adding relatively larger amounts of hydroxyethylcellulose in monomer composition, monomers were not dispersed well and inhomogeneous products were obtained due to the increase of the viscosity.

[Note]
a: MMA-methylmetacrylate, BA-butylacrylate, EA-ethylacrylate, M-acrylic acid, MA-metacrylic acid, DVB-divinylbenzene, HEC-hydroxyethylcellulose. All figures are the weight of each substance per 100 g of distilled water.
b: A latex of 10 wt % at relatively high Tg(=37.2° C.), manufactured by stylene, butylacrylate and metacrylic acid.
c: Silicasol of 30 wt parts.
d: Theoretical value based upon only the composition of monomers.
e: Reutilization ability examined from surface damage and contamination caused by strong adhesion (O: high, Δ: middle, x: low).
f: An antislipping agent was sprayed and after hardening for 30 minutes, this value was decided from the friction coefficient measured by a slant method for paper and pasteboard of JIS P 8147.
A pendulum prepared by stainless steel (width: 60 mm, length: 100 mm, weight: 1,000 g).

TABLE 1

| | Composition of monomers[a] (wt parts) | | | | | | Additives (wt parts) | | | Polymer | Antislipping agent | Slipping | Solids |
| | | | | | | | | | | | Homogeneity/Adhesiveness/ | angle[f] | conc. |
| | MMA | BA | EA | AA | MA | DVB (×10³) | HEC | Latex[b] | Silicasol[c] | Tg[d] (° C.) | Hardness/Reusability[e] | (°) | (wt. %) |
| Examples | | | | | | | | | | | | | |
| 1 | 7.02 | 1.88 | 7.14 | 0.40 | — | 8.58 | 1.50 | 3.00 | 2.00 | 31.7 | O/Δ/O/X | 35 | 22.9 |
| 2 | 4.98 | 2.32 | 7.12 | 0.36 | — | 5.91 | 1.20 | 2.75 | 1.60 | 18.9 | O/Δ/O/X | 37 | 20.3 |
| 3 | 3.61 | 2.36 | 5.57 | 0.29 | — | 4.73 | 1.00 | 2.50 | 1.00 | 13.5 | O/Δ/O/X | 39 | 16.3 |
| 4 | 2.45 | 1.81 | 4.04 | 0.20 | — | 3.40 | 0.90 | 2.30 | 0.80 | 10.8 | O/Δ/O/Δ | 38 | 12.5 |
| 5 | 1.88 | 1.40 | 3.38 | 0.16 | — | 2.72 | 0.70 | 2.25 | 0.70 | 9.2 | O/O/O/Δ | 42 | 10.5 |
| 6 | 1.17 | 1.17 | 1.87 | 0.10 | — | 1.84 | 0.50 | 2.10 | 0.50 | 8.2 | O/O/O/O | 44 | 7.2 |
| 7 | 1.17 | 1.17 | 1.87 | — | 0.10 | 1.84 | 0.50 | 2.10 | 0.50 | 8.7 | O/O/O/O | 43 | 7.2 |
| 8 | 1.05 | 1.50 | 1.05 | — | 0.09 | 1.48 | 0.50 | 2.00 | 0.40 | 4.8 | O/O/Δ/Δ | 47 | 6.6 |
| 9 | 0.52 | 1.12 | 1.16 | 0.08 | — | 1.14 | 0.40 | 1.10 | 0.20 | -8.8 | O/O/Δ/X | 49 | 4.6 |
| 10 | 0.35 | 1.12 | 1.33 | 0.08 | — | 1.14 | 0.40 | 1.10 | 0.20 | -18.3 | O/O/X/X | 51 | 4.6 |
| 11 | 0.27 | 1.37 | 1.16 | 0.08 | — | 1.14 | 0.40 | 1.10 | 0.20 | -22.7 | O/O/X/X | 53 | 4.6 |
| 12 | 0.82 | 1.16 | 0.82 | 0.08 | — | 1.14 | 0.40 | 1.10 | 0.20 | 41 | O/Δ/O/Δ | 37 | 4.6 |
| 13 | 0.82 | 1.16 | 0.82 | 0.08 | — | 1.14 | 0.30 | 1.10 | 0.10 | 4.1 | Δ/Δ/O/Δ | 38 | 4.4 |
| 14 | 0.58 | 0.58 | 0.84 | 0.04 | — | 0.82 | 0.40 | 0.90 | 0.20 | 7.5 | O/Δ/O/Δ | 37 | 3.5 |
| 15 | 0.58 | 0.84 | 0.58 | — | 0.04 | 0.82 | 0.40 | 0.90 | 0.10 | 3.9 | O/Δ/Δ/Δ | 39 | 3.4 |
| 16 | 0.35 | 0.35 | 0.50 | 0.03 | — | 0.49 | 0.40 | 1.10 | 0.10 | 8.2 | O/Δ/O/Δ | 36 | 2.8 |
| 17 | 0.35 | 0.50 | 0.35 | — | 0.03 | 0.49 | 0.40 | 1.10 | — | 4.8 | O/Δ/Δ/Δ | 37 | 2.7 |
| 18 | 0.25 | 0.45 | 0.55 | 0.03 | — | 0.51 | 0.30 | — | — | -5.4 | O/Δ/O/Δ | 40 | 2.7 |
| Comp. Examples | | | | | | | | | | | | | |
| 1 | 3.61 | 2.36 | 5.57 | 0.29 | — | 4.73 | 1.00 | — | — | 13.5 | O/X/O/X | — | 12.8 |
| 2 | 1.87 | 1.87 | 2.67 | 0.16 | — | 2.82 | 0.80 | 1.10 | — | 8.2 | O/Δ/O/Δ | 33 | 8.5 |
| 3 | 1.52 | 1.52 | 2.17 | 0.13 | — | 2.14 | 0.85 | 0.90 | — | 8.2 | O/Δ/O/Δ | 32 | 8.9 |
| 4 | 1.17 | 1.17 | 1.87 | — | 0.10 | 1.84 | — | 0.08 | — | 8.7 | X/X/X/X | — | 5.0 |
| 5 | 1.17 | 1.17 | 1.87 | 0.05 | — | — | 0.10 | — | — | 7.0 | Δ/X/Δ/X | — | 4.2 |
| 6 | 1.17 | 1.17 | 1.87 | 0.05 | — | — | 0.20 | — | — | 7.0 | X/X/O/X | — | 4.3 |
| 7 | 1.17 | 1.17 | 1.87 | 0.05 | — | — | 0.50 | — | — | 7.0 | O/X/O/Δ | — | 4.6 |
| 8 | 1.17 | 1.17 | 1.87 | 0.03 | — | — | 1.20 | — | — | 6.7 | Δ/X/Δ/Δ | — | 5.2 |
| 9 | 0.92 | 1.44 | 1.87 | 0.10 | — | — | 0.50 | — | 0.50 | -1.8 | O/Δ/Δ/Δ | 27 | 5.1 |
| 10 | 0.92 | 1.44 | 1.87 | 0.07 | — | — | 0.40 | — | 0.20 | -2.8 | O/X/Δ/Δ | 25 | 4.7 |
| 11 | 0.92 | 1.44 | 1.67 | 0.07 | — | — | 0.40 | — | — | -4.4 | O/Δ/Δ/Δ | — | 4.5 |
| 12 | 0.45 | 1.17 | 1.16 | — | 0.06 | 1.14 | 0.40 | — | — | -11.0 | O/X/X/X | — | 3.2 |
| 13 | 0.82 | 0.82 | 1.16 | — | 0.30 | 1.24 | 0.40 | — | — | 8.0 | X/Δ/X/X | — | 3.5 |
| 14 | 0.58 | 0.58 | 0.84 | — | 0.20 | — | 0.40 | — | — | 16.9 | X/X/Δ/X | — | 2.6 |
| 15 | 0.58 | 0.58 | 0.84 | 0.04 | — | — | 0.30 | — | — | 7.5 | O/X/O/X | — | 2.3 |
| 16 | 0.35 | 0.50 | 0.35 | — | 0.06 | — | 0.20 | 0.90 | — | 5.9 | Δ/Δ/O/Δ | 30 | 2.4 |
| 17 | 0.35 | 0.50 | 0.35 | — | — | — | 0.07 | — | — | 1.7 | X/X/X/X | — | 1.3 |

The slant speed of a slant plate was less than 3° per second.

The slant angle was measured when a packaging box raised on a slant plate was slipped with the increase of the slant angle.

According to said Table 1, it was revealed as followings:

In Examples of this invention, aqueous hydroxyethylcellulose was used for increasing the viscosity of solution and then, the emulsion polymerization reaction was performed mainly with acryl monomers having low Tg to give a latex with dispersion stability. As the result, said compound itself has the antislipping effects. However, in order to prepare an antislipping agent with the more remarkabkable antislipping effects, in this invention, another acrylic monomer having relatively high Tg was blended with previously prepared latex, and some additives such as silica were added to the mixture. Now that the blending material exhibits a remarkable antislipping effect and it is available for a stable storage and transportation after stacked on any packaging box made of craft paper.

What is claimed is:

1. A process for manufacturing an acrylic antislipping agent comprising the steps of:
   a) emulsion polymerizing acrylic monomers to obtain a first acrylic latex having a glass transition temperature (Tg) of greater than or equal to 90° C., wherein, the dried homopolymer of said acrylic monomers have glass transition temperatures ranging from 8 to 153° C.;
   b) emulsion polymerizing of acrylic monomers to obtain a second acrylic latex having a Tg less than or equal to −5° C., wherein, the dried homopolymers of said acrylic monomers have glass transition temperatures ranging from −85 to −5° C.;
   c) adding at least one acrylic monomer containing at least one carboxyl acid group to said first acrylic latex;
   d) adding at least one acrylic monomer containing at least one carboxyl acid group to said second acrylic latex; and
   e) blending said first and said second acrylic latexes together through neutralization with aqueous ammonia to form a final acrylic latex.

2. The process for manufacturing an acrylic antislipping agent according to claim 1, wherein the concentration of said at least one acrylic monomer containing at least one carboxyl acid group ranges from 0.02 to 7.0 weight parts of the total amount of the acrylic monomers comprising said first acrylic latex.

3. The process for manufacturing an acrylic antislipping agent according to claim 1, wherein the concentration of said at least one acrylic monomer containing at least one carboxyl acid group ranges from 0.02 to 7.0 weight parts of the total amount of the acrylic monomers comprising said second acrylic latex.

4. The process for manufacturing an acrylic antislipping agent according to claim 2, wherein one or more monomers containing at least one carboxylic acid groups are selected from the group consisting of acrylic acid, methacrylic acid, maleic acid and itaconic acid.

5. The process for manufacturing an acrylic antislipping agent according to claim 1, wherein the first latex, one or more monomers are selected from the group consisting of ethyl acrylate, n-butyl acrylate, isopropyl acrylate, 2-ethylhexyl acrylate, n-hexyl metacrylate, lauryl metacrylate, 2-hydroxyethyl acrylate and hydroxypropyl acrylate.

6. The process for manufacturing an acrylic antislipping agent according to claim 1, wherein the second latex, one or more monomers are selected from the group consisting of methyl acrylate, methyl methacrylate, ethyl methacrylate, isobutyl methacrylate, 2-hydroxyethyl methacrylate, hydroxypropyl methacrylate, acrylamide, diacetone acrylamide, glycidyl methacrylate, styrene, vinyl acetate and acrylonitrile.

7. The process for manufacturing an acrylic antislipping agent according to claim 1, wherein the solid content of said final acrylic latex is adjusted to range from 2 to 8 weight percent.

* * * * *